United States Patent [19]

Okumura et al.

[11] Patent Number: 4,864,231
[45] Date of Patent: Sep. 5, 1989

[54] BEARING ASSEMBLY HAVING A WHEEL SPEED SENSOR

[75] Inventors: Tsuyoshi Okumura; Makoto Nohara, both of Osaka, Japan

[73] Assignee: Koyo Seiko Co., Ltd., Osaka, Japan

[21] Appl. No.: 198,838

[22] Filed: May 26, 1988

[30] Foreign Application Priority Data

Jul. 23, 1987 [JP] Japan .................................. 62-186464

[51] Int. Cl.⁴ ........................ G01P 3/48; G01P 3/488; F16C 19/02
[52] U.S. Cl. ................. 324/173; 188/181 R; 384/448
[58] Field of Search ................... 324/13, 17, 207, 208; 310/155, 168; 188/181 R

[56] References Cited

U.S. PATENT DOCUMENTS

| | | |
|---|---|---|
| 3,651,901 | 3/1972 | Burckhardt et al. |
| 4,069,435 | 1/1978 | Wannerskog et al. ............... 310/168 |
| 4,171,495 | 10/1979 | McNinch, Jr. ................. 310/168 X |
| 4,259,637 | 3/1981 | Bloomfield et al. ............ 324/173 X |
| 4,288,746 | 9/1981 | Singbartl ........................ 324/173 X |
| 4,732,494 | 3/1988 | Guers et al. .................... 324/208 X |

FOREIGN PATENT DOCUMENTS

| | | | |
|---|---|---|---|
| 2264285 | 11/1975 | France | 324/173 |
| 0208667 | 12/1983 | Japan | 324/173 |
| 1353306 | 5/1974 | United Kingdom . | |
| 1400801 | 7/1975 | United Kingdom . | |

Primary Examiner—Gerard R. Strecker
Attorney, Agent, or Firm—Wenderoth, Lind & Ponack

[57] ABSTRACT

A bearing assembly for an axle shaft of a vehicle. An inner ring includes a cylindrical body and an outer flange for mounting a wheel. On a portion of the cylindrical body adjacent the flange is mounted a revolution detection ring which has a seal contact portion and a gear-shaped detected portion having a plurality of projections circumferentially spaced on the outer peripheral surface thereof. The bearing assembly also has an outer ring which is coupled with the inner ring through rolling elements and mounted to the chassis of the vehicle. A sensor is mounted on the outer ring such that it confronts the gear-shaped portion of the revolution detection ring and detects the projections passing by the sensor so as to determine the annular speed of the wheel. The assembly also has a bearing seal which is mounted on the outer ring and kept in contact with the seal contact portion of the revolution detection ring so as to prevent contamination by sand, mud, or the like.

8 Claims, 3 Drawing Sheets

BEARING ASSEMBLY HAVING A WHEEL SPEED SENSOR

BACKGROUND OF THE INVENTION

The present invention relates to a bearing assembly for an axle shaft of a vehicle having a sensor for detecting the speed of rotation of a wheel attached to the axle shaft so as to control the operation of a brake ring in accordance with the speed of the wheel so that the wheel will not lock when it is suddenly braked, for example on a frozen road surface.

A prior art bearing apparatus of this kind is shown in FIG. 3. The bearing apparatus comprises an inner ring 51 consisting of two adjacent portions and fixed to an end portion of an axle shaft 50 of a freely rotatable wheel 54; an outer ring 55 connected to the wheel 54 at one end thereof; and a plurality of rolling elements or bearings 53 in two rows, the rolling elements in each row being positioned between the inner ring 51 and outer ring 55 and spaced a distance from each other by a retainer 52 in the circumferential direction of the inner and outer rings 51 and 55. The bearing apparatus is also provided with a revolution detection ring 56 which is fixed to the outer surface of the outer ring 55 at the other end thereof and which cooperates with a sensor 57, described later, for detecting the number of revolutions of the wheel. The revolution detection ring 56 is made of a ferromagnetic material and has projections like the teeth of a gear on the outer surface thereof. The sensor 57, which houses a permanent magnet and a coil, is fixed to the base of the axle shaft 50 at a slight distance from the outer surface of the revolution detection ring 56. The sensor 57 detects the number of revolutions of the wheel 54 by cooperating with the revolution detection ring 56. That is, when the revolution detection ring 56 rotates along with the wheel 54, magnetic flux generated from the permanent magnet of the sensor 57 is varied by the gear-shaped projections formed on the outer periphery of the revolution detection ring 56. As a result, an alternating voltage of a frequency proportional to the revolution speed of the revolution detection ring 56 is generated in the coil of the sensor 57. Therefore, the revolution speed of the wheel 54 is determined by detecting the frequency of the alternating voltage.

However, it is necessary to adjust the gap between the revolution detection ring 56 and the sensor 57 finely when the bearing apparatus is mounted on the axle shaft 50, because the revolution detection ring 56 is mounted on the outer ring 55, whereas the sensor 57 is mounted on the base of the axle shaft 50 to be spaced from the outer peripheral surface of the outer ring 55. Therefore, the production rate of such a bearing apparatus for an axle shaft is not high. Further, the space occupied by the bearing apparatus is large because the revolution detection ring 56 is mounted on the outer peripheral surface of the outer ring 55 and the sensor 57 is required to be near the revolution detection ring 56. In addition, since the sensor 57 secured to the base of the axle shaft 50 projects from a protection cover 58 of the vehicle, when earth, sand, muddy water, or the like enters the gap between the protection cover 58 and a brake shoe 59 fixed to the outer ring 55, and advances as shown by the arrow A, a tip portion of the sensor 57, defining a pulse detecting portion, and the gear formed on the outer peripheral surface of the revolution detection ring 56 are damaged, which causes an inaccurate detection of the revolution speed of the wheel 54.

SUMMARY OF THE INVENTION

It is therefore an object of the present invention to provide a bearing assembly for an axle shaft of a vehicle which does not necessitate the adjustment of a gap between a revolution detection ring and a sensor in assembling a vehicle.

It is another object of the present invention to provide a bearing assembly for an axle shaft of a vehicle in which the revolution detection ring and the sensor are accommodated in a small space.

It is still another object of the present invention to provide a bearing assembly for an axle shaft of a vehicle in which the revolution detection ring and the sensor are not damaged by incoming earth and sand, muddy water or the like.

In order to accomplish these objects, a bearing assembly for an axle of a vehicle in accordance with the present invention is characterized in that it comprises an inner ring which includes a generally cylindrical body and an outer flange protruding at one end thereof in a direction radially outwardly from the cylindrical body and is fitted to a wheel of a vehicle through the flange; an outer ring which is mounted on the inner ring through rolling elements and fitted to a chassis of the vehicle; a revolution detecting ring which is mounted on a portion of the inner ring adjacent to the flange and has a seal contact portion and a detected portion, the detected portion having a plurality of projections spaced a distance from each other in the circumferential direction of the revolution detecting ring; a sensor which is fixed to the outer ring in such a manner that the sensor confronts the detected portion of the revolution detection ring for detecting the projections passing through the sensor, whereby the number of revolutions of the wheel can be detected; and a bearing seal which is attached to the outer ring and kept in contact with the seal contact portion of the revolution detection ring.

The operation of the bearing assembly in accordance with the present invention is described hereinafter.

When the inner ring secured to the axle shaft rotates, the revolution detection ring rotates therewith at the same annular velocity. The sensor detects the projections passing by the sensor and thereby detects the number of revolutions of the revolution detection ring. Thus, the annular speed of the wheel is obtained. While these rings are rotating, the bearing seal mounted on the outer ring is kept in contact with the seal contact portion on the outer peripheral surface of the revolution detection ring, whereby the penetration of soil, sand or muddy water into a gap between the outer ring and the revolution detection ring can be prevented.

BRIEF DESCRIPTION OF THE DRAWINGS

The present invention will become more fully understood from the detailed description given below and the accompanying drawings wherein.

DETAILED DESCRIPTION OF PREFERRED EMBODIMENTS

Figure 1:
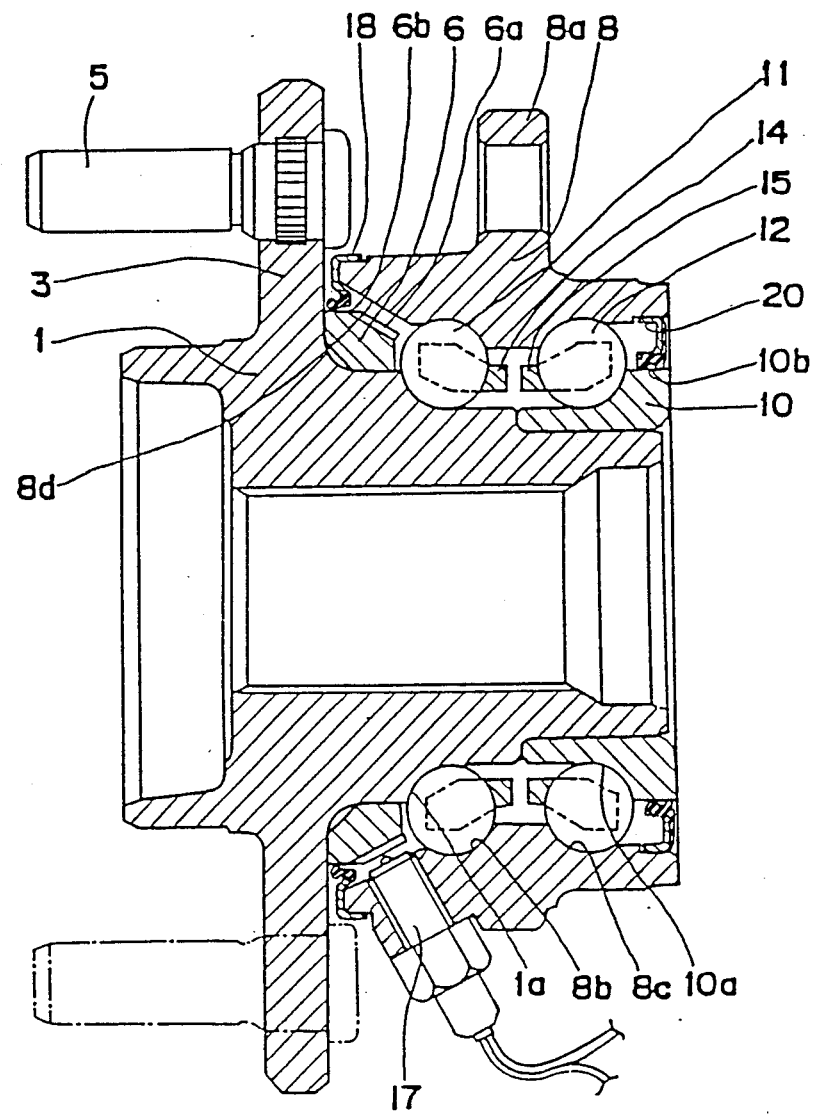
FIG. 1 is a section view showing an embodiment of the present invention.

Referring to FIG. 1, a bearing apparatus embodying the present invention has an inner ring 1, a revolution detection ring 6, an outer ring 8, a sensor 17, and bearing seals 18 and 20. The inner ring 1 has an outer flange 3 protruding at one end thereof in a direction radially outwards from a cylindrical body portion of the inner ring 1 and fixed to a wheel (not shown) of a vehicle with a bolt 5. The revolution detection ring 6 is so mounted at a corner portion defined by an end surface of the flange 3 and the cylindrical body portion of the inner ring 1 as to be in contact with the flange 3 and cylindrical body portion of the inner ring 1.

The revolution detection ring 6 having a sectionally polygonal shape is made of a ferromagnetic material. The ring 6 has a seal contact portion 6b, the outer surface of which is cylindrical, and a gear-shaped, substantially conical detected portion with a plurality of bevel gear-shaped projections 6a spaced a distance from each other in the circumferential direction of the revolution detection ring 6. The outer ring 8 is mounted both on the inner ring 1 and a ring member 10 mounted on the outer peripheral surface of the inner ring 1 through two adjacent rows of balls 11 and 12 serving as rolling elements. Ring 8 is fixed to the vehicle with a flange 8a. The two rows of balls 11 and 12 are disposed circumferentially at regular intervals by means of retainers 14 and 15. The balls 11 and 12 roll between raceway grooves 1a and 8b of the inner ring 1 and of the outer ring 8 and between raceway grooves 10a and 8c of the ring member 10 and of the outer ring 8, respectively. Part of the inner peripheral surface of the outer ring 8 forms a conical surface 8d which confronts the bevel gear-shaped projections 6a of the revolution detection ring 6. From the conical surface 8d projects a tip of a proximity switch acting as the sensor 17, which is placed in the outer ring 8 and inclined substantially normal to the outer surface of the revolution detection ring 6 so that the proximity switch 17 may confront the projections 6a of the revolution detection ring 6, though slightly spaced therefrom. The switch 17 houses a coil which generates a magnetic field. A bearing seal 18 contacts the seal contact portion 6b of the revolution detection ring 6 and is fitted to the outer peripheral surface of the outer ring 8 on the side of the wheel. A bearing seal 20 contacts a seal contact portion 10b formed on the outer peripheral surface of the ring member 10 and is mounted on the inner peripheral surface of the outer ring 8. The bearing seals 18 and 20 are composed of core metals and rubber and seal the gap between the inner and outer rings 1 and 8.

When the inner ring 1 rotates, the revolution detection ring 6 secured thereto rotates therewith. As a result, a magnetic flux generated from the coil housed in the proximity switch 17 is varied by the projections 6a of the revolution detection ring 6, so that an alternating voltage having a frequency proportional to the revolution speed of the revolution detection ring 6 is generated in the coil.

The alternating voltage is applied to a tachometer (not shown) as a detection signal. The tachometer computes the revolution speed of the wheel in accordance with the frequency of the signal and indicates the computation result.

During the rotation of these rings 1, 6, and 10, earth, sand, muddy water, or the like is prevented from penetrating through a gap between the revolution detection ring 6 and the outer ring 8 and a gap between the ring member 10 and the outer ring 8 due to the bearing seals 18 and 20. Therefore, the revolution detection ring 6 and the tip portion of the switch 17 which confronts the projections 6a are neither damaged nor disordered. Thus, the revolution detection ring 6 and the sensor 17 are durable and capable of accurately detecting the revolution speed of the wheel.

As described above, the revolution detection ring 6 is mounted on the inner ring 1 so as to rest against the flange 3 thereof, and the switch 17 is mounted in the outer ring 8 oblique to the flange 3 so as to confront the projections 6a of the revolution detection ring 6 with a slight distance provided therebetween. Because of this arrangement, the bearing assembly can be of a small size. Accordingly, the space which the bearing assembly occupies in the vehicle is small.

Since the switch 17 is oblique to the outer ring 8, the switch 17 can be longer, compared with the length of a switch which would be mounted perpendicularly to the outer ring 8. Thus, the switch 17 can obtain a higher sensitivity in detecting the revolution speed of the wheel.

Adjustment of the gap between the revolution detection ring 6 and the proximity switch 17 is unnecessary during mounting of the bearing assembly on the axle shaft because the gap therebetween can be adjusted when assembling the bearing assembly. Thus, the production rate for assembling vehicles improves.

Figure 2:
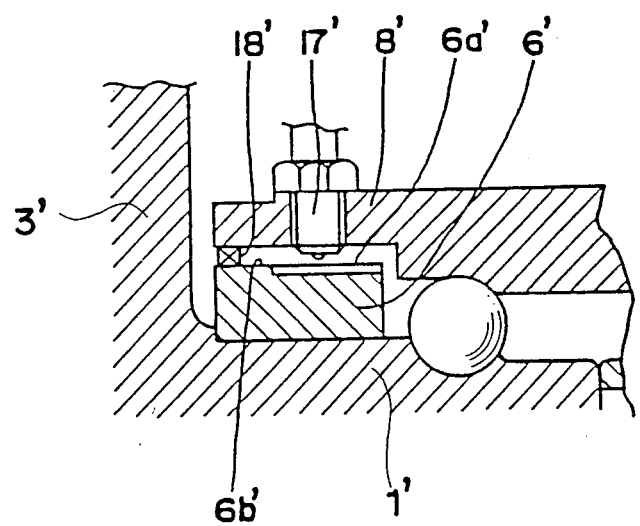
FIG. 2 is a section view showing another embodiment of the present invention.
Figure 3:
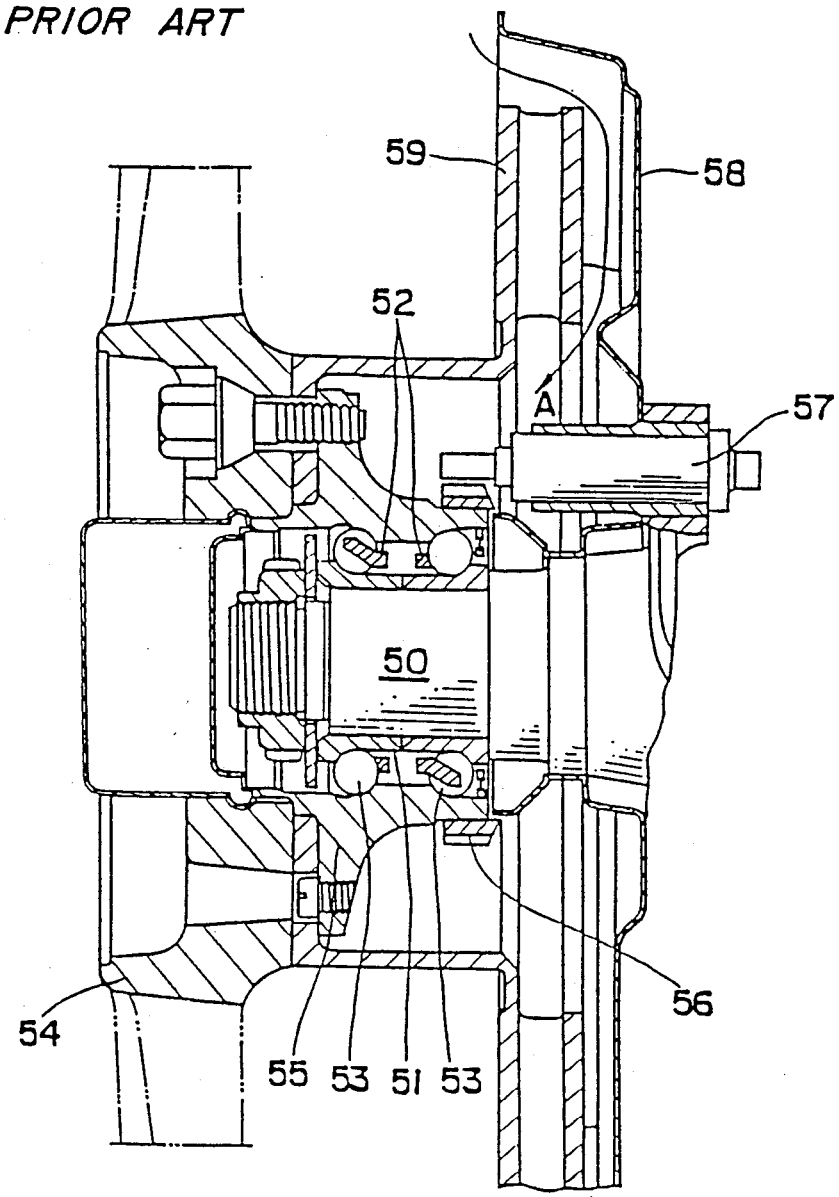
FIG. 3 is a section view showing a prior art apparatus.

FIG. 2 shows another embodiment of the present invention. An inner ring 1' has an outer flange 3'. A revolution detection ring 6' is mounted on a portion of the inner ring 1' adjacent to the flange 3'. The revolution detection ring 6' has a cylindrical detected portion having spur gear-shaped projections 6a' and a cylindrical seal contact portion 6b' on the outer surface thereof. A tip of a switch 17' acting as a sensor mounted on an outer ring 8' confronts the projections 6a' of the revolution detection ring 6' with a slight gap provided therebetween. A bearing seal 18' is mounted on the outer ring 8' so as to be in contact with the seal contact portion 6b', so that earth, sand or muddy water is prevented from penetrating therethrough.

In the above embodiments, the revolution speed of a wheel is detected by the revolution detection ring and the proximity switch, but optical sensors such as a photoelectric tube may be employed instead of the proximity switch.

As is apparent from the foregoing description, a bearing assembly for an axle shaft of a vehicle of the present invention is provided with a revolution detection ring which is mounted on a portion of an inner ring adjacent to a flange of the inner ring and has a seal contact portion and a detected portion on the outer surface thereof, and a sensor mounted on an outer ring for detecting the annular speed of the revolution detection ring. An advantage obtained by this construction is that the adjustment of the gap between the revolution detection ring and the switch is unnecessary during mounting of the bearing assembly on a vehicle because the gap therebetween can be adjusted when assembling the bearing assembly. Thus, the production rate for assembling vehicles improves.

Further, the bearing assembly can be of a small size because space at a portion of the inner ring adjacent to the flange is effectively utilized to mount the revolution detection ring and the sensor.

The revolution detection ring and the sensor are durable and detect revolution speed of wheel with a high accuracy for a long time because a bearing seal which is mounted on the outer ring and kept in contact with the seal contact portion of the revolution detection ring prevents earth, sand, muddy water, or the like from penetrating into the gap between the revolution detection ring and the outer ring.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Bearing assembly having a wheel speed sensor, comprising:

an inner ring including a generally cylindrical body, said cylindrical body including means to allow connection to an axle shaft of a vehicle, said cylindrical body having a radially extending flange at one end thereof adapted to be connected to a wheel of a vehicle;

an outer ring concentric to said cylindrical body, said outer ring including means to allow connection to a chassis of a vehicle;

rolling elements mounted in an annular gap between said inner and outer rings to allow relative rotation between said rings;

a revolution detection ring mounted on said cylindrical body adjacent said flange, said dectection ring including a seal contact portion and a detected portion;

a sensor connected to said outer ring so as to confront said detected portion of said detection ring; and a bearing seal having a first portion connected to said outer ring and a second portion in sealing contact with said seal contact portion of said detection ring; whereby said sensor detects the passage of said detected portion and thus the rotation of the wheel.

2. An assembly as claimed in claim 1, wherein said revolution detection ring includes a first surface mounted on said cylindrical body and a second surface contacting said flange, said detected portion is a substantially conical surface, and said sensor is connected to said outer ring so as to be substantially normal to said substantially conical surface.

3. An assembly as claimed in claim 2, wherein an area between said first surface and said second surface of said detection ring is beveled.

4. An assembly as claimed in claim 2, wherein said substantially conical surface includes a plurality of spaced projections extending therefrom.

5. An assembly as claimed in claim 2, wherein said outer ring includes an annular portion extending toward said flange and at least partially overhanging said detection ring in a direction substantially along the center line of said rings, said sensor extending through and being connected to said annular portion.

6. An assembly as claimed in claim 1, wherein said detected portion of said detection ring is a substantially cylindrical surface and said sensor is connected to said outer ring so as to be substantially normal to said substantially cylindrical surface.

7. An assembly as claimed in claim 6, wherein said substantially cylindrical surface includes a plurality of spaced projections extending therefrom.

8. An assembly as claimed in claim 6, wherein said outer ring includes an annular portion extending toward said flange and at least partially overhanging said detection ring in a direction substantially along the center line of said rings, said sensor extending through and being connected to said annular portion.

* * * * *